US008627886B2

(12) United States Patent
O'Connor et al.

(10) Patent No.: US 8,627,886 B2
(45) Date of Patent: Jan. 14, 2014

(54) SYSTEMS AND METHODS FOR LOW EMISSION HYDROCARBON RECOVERY

(75) Inventors: Daniel J. O'Connor, Calgary (CA); Cameron Hardy, Calgary (CA)

(73) Assignees: Orion Projects Inc., Calgary, Alberta (CA); Daniel O'Connor, Calgary, Alberta (CA)

(*) Notice: Subject to any disclaimer, the term of this patent is extended or adjusted under 35 U.S.C. 154(b) by 536 days.

(21) Appl. No.: 12/743,691

(22) PCT Filed: Dec. 19, 2008

(86) PCT No.: PCT/CA2008/002197
§ 371 (c)(1),
(2), (4) Date: May 19, 2010

(87) PCT Pub. No.: WO2009/076763
PCT Pub. Date: Jun. 25, 2009

(65) Prior Publication Data
US 2010/0282644 A1 Nov. 11, 2010

Related U.S. Application Data

(60) Provisional application No. 61/014,828, filed on Dec. 19, 2007.

(51) Int. Cl.
*E21B 43/24* (2006.01)
*E21B 43/34* (2006.01)
*E21B 43/40* (2006.01)

(52) U.S. Cl.
USPC ............ 166/266; 166/52; 166/57; 166/267; 166/272.3; 166/303; 208/400

(58) Field of Classification Search
USPC ........................................ 208/390, 391, 400
See application file for complete search history.

(56) References Cited

U.S. PATENT DOCUMENTS

| 2,734,578 | A | * | 2/1956 | Walter | 166/402 |
| 3,993,135 | A | * | 11/1976 | Sperry et al. | 166/303 |
| 4,224,991 | A | * | 9/1980 | Sowa et al. | 166/272.3 |
| 4,398,604 | A | * | 8/1983 | Krajicek et al. | 166/303 |
| 4,429,745 | A | | 2/1984 | Cook | |
| 4,498,542 | A | | 2/1985 | Eisenhawer et al. | |
| 4,499,946 | A | * | 2/1985 | Martin et al. | 166/57 |

(Continued)

FOREIGN PATENT DOCUMENTS

| WO | 2007098100 | 8/2007 |
| WO | 2008097666 | 8/2008 |

*Primary Examiner* — George Suchfield
(74) *Attorney, Agent, or Firm* — Orion Projects Inc.; Daniel O'Connor

(57) ABSTRACT

Systems and methods are provided for low emission (in-situ) heavy oil production, using a compound heat medium, comprising products of combustion of a fuel mixture with an oxidant and a moderator, mixed with steam generated from direct contact of hot combustion products with water, under pressure. The compound heat medium, comprising mainly $CO^2$ and steam, is injected at pressure into a hydrocarbon reservoir, where steam condenses out of the compound heat medium releasing heat to the reservoir. The condensate is produced with the hydrocarbon as a hydrocarbon/water mixture or emulsion. Non-condensable gases, primarily $CO^2$, from the compound heat medium may remains in the reservoir through void replacement, leakage to adjacent geological strata. Beneficially, any $CO^2$ produced is recovered at pressure, for use in other processes, or for disposal by sequestration. Produced water is recovered and recycled as a moderator and steam generating medium.

34 Claims, 9 Drawing Sheets

(56) References Cited

U.S. PATENT DOCUMENTS

| | | | |
|---|---|---|---|
| 4,546,829 A | 10/1985 | Martin et al. | |
| 7,299,868 B2 * | 11/2007 | Zapadinski | 166/266 |
| 7,341,102 B2 | 3/2008 | Kresnyak et al. | |
| 7,654,320 B2 * | 2/2010 | Payton | 166/257 |
| 2003/0062159 A1 | 4/2003 | Nasr | |
| 2006/0207762 A1 | 9/2006 | Ayasse | |
| 2006/0243448 A1 * | 11/2006 | Kresnyak et al. | 166/303 |
| 2007/0202452 A1 | 8/2007 | Rao | |
| 2008/0289821 A1 | 11/2008 | Betzer Tsilevich | |
| 2008/0289822 A1 | 11/2008 | Betzer Tsilevich | |
| 2010/0050517 A1 | 3/2010 | Betzer Tsilevich | |

* cited by examiner

Parametric SAGD ZEIP Comparison

| Parameter | SAGD | ZEIP | | |
|---|---|---|---|---|
| Economics | | | | |
| OPEX | 1 | 0.51 | Normalized to SAGD | |
| CAPEX | 1 | 0.89 | Normalized to SAGD | |
| | | | natural gas SAGD vs asphaltene ZEIP | |
| Emissions | | | | |
| SOx | 0 | 0 | g/GJ | |
| NOx | 15 | 0 | g/GJ | |
| Particulate Matter | 0 | 0 | g/GJ | |
| Carbon Dioxide | 32.5 | 0 | kg/barrel | |
| Utilities Consumption | | | | |
| Fuel Consumpion | 1.07 | 0.86 | GJ per barrel | |
| Electrical Power Requirement | 0.36 | 0.62 | kW per barrel | |
| Water Consumption | 0.44 | 0.04 | barrel make up per barrel | |
| Water Disposal | 0.44 | 0.09 | barrel disposal per barrel | |
| Thermal Efficiency | | | | |
| Combustor or boiler efficiency | 83% | 98% | % of HHV of fuel delivered to steam | |
| Low Grade Heat Rejection | 0.30 | 0.18 | GJ per barrel | |

Figure 8

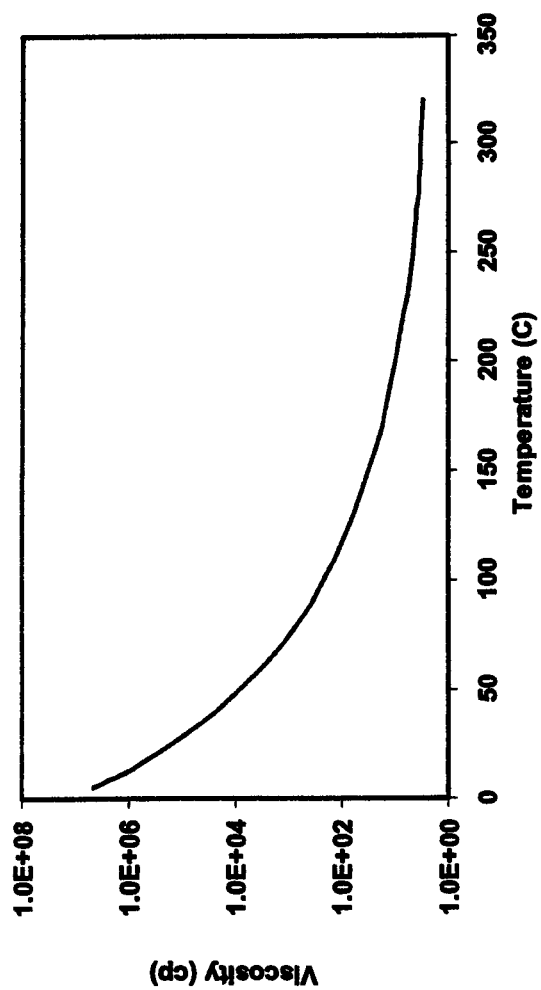
Figure 9 Bitumen Viscosity vs. Temperature

SYSTEMS AND METHODS FOR LOW EMISSION HYDROCARBON RECOVERY

CROSS-REFERENCE TO RELATED APPLICATIONS

This application claims priority from U.S. Provisional Patent application Ser. No. 61/014,828 entitled "Systems and Methods for Low Emission Heavy Oil In Situ Production", filed Dec. 19, 2007, which is incorporated herein by reference.

TECHNICAL FIELD

The invention is related to systems and methods for low emission hydrocarbon recovery, and more particularly to systems and method for in situ hydrocarbon production, and production of heavy oil, or other hydrocarbons from mined materials, with reduced emissions, lessened environmental impact and improved economics through CAPEX and OPEX reductions.

BACKGROUND OF THE INVENTION

Heavy oil extracted by existing commercially proven in-situ production techniques such as Cyclic Steam Stimulation (CSS) and Steam Assisted Gravity Drainage (SAGD) are known to have very high operating expenditures (OPEX); significant emissions ($CO_2$, SOx, NOx, and particulate matter) and water consumption per barrel of crude produced; as well as the highest capital expenditure (CAPEX) per flowing barrel of capacity than all other oil and gas production in the world.

Moreover, a barrel of heavy oil is sold at a substantial discount to the benchmark conventional crude oils such as Brent and West Texas Intermediate as there is a great deal of upgrading required to bring heavy oil up to the quality of these conventional crudes. The qualities of bitumen that reduce its market value are: low API (Association of Petroleum Institute) gravity, high TAN (total acid number), high carbon residue, high sulphur content and high metals content (e.g. vanadium and nickel). The aforementioned parameters make the production of heavy oil marginally economical at average long term crude prices while leaving a legacy of ecological damage for future generations.

OPEX are generally divided into fixed and variable costs. Fixed OPEX includes O&M (Operations and Maintenance). Variable OPEX include the costs of fuel gas, diluent, electrical power, chemicals, catalysts, consumables, royalties and taxes. Fuel gas is consumed to raise steam in a steam plant. The steam is injected into the reservoir, heating the reservoir to enable the bitumen viscosity to be lowered such that it can be mobilized and pumped to the surface (i.e. produced). Electrical power is consumed by motor drivers for the sophisticated systems of pumps, combustion air blowers, aerial coolers, and compressors.

World economic growth and depleting conventional oil reserves has resulted in the need for heavy oil and other high cost hydrocarbon resources to be extracted to meet the growing demand. The current in-situ and mining processes for bitumen are energy intensive in terms of their requirements for steam and power and, unfortunately, produce more emissions (e.g. $CO_2$, NOx, SOx, particulates) than any other production technique.

Diluents

Still further, heavy oil will not separate efficiently at production temperatures using Stokes law, as its specific gravity is generally too close to that of the produced water. As the viscosity and pour points of heavy oil at ambient temperatures makes it difficult to transport, light diluents, such as synthetic crude oil, naphtha and natural gas condensates, are required to blend with the oil to improve viscosity, pour point and API specific gravity, thereby facilitating the separation of the oil from the produced water and enabling its transport to upgraders/refiners.

The cost of diluents is affected by losses realized in the separation process and overall blended volume shrinkage as well as transportation costs incurred in transporting the purchased diluent to site and then transporting it back with the bitumen to the upgrader/refinery.

Natural Gas

Historically, low cost natural gas has been used as the primary energy source for bitumen recovery. The ever increasing consumption of natural gas by the rapidly developing Oil Sands in-situ and mining projects will put enough demand on the supply of natural gas to substantially increase the price for all who rely on its use. Natural gas has the lowest $CO_2$, NOx and SOx emissions per unit of energy released than all other fossil fuels with the exception of pure hydrogen. Natural gas does not require expensive boilers, NOx reduction, flue gas desulphurization and particulate matter emissions reduction equipment. This makes natural gas the preferred fuel choice for decentralized energy consumption such as residential/commercial heating, transportation and peak power production in combined cycle plants that rely on low cost facilities/equipment. In other words, while a highly effective fuel source for bitumen recovery, natural gas is a non-ideal and expensive method for the task of simply raising heat to mobilize bitumen.

Alternative Fuels

As a result, there has been a desire to use alternative fuels. However, the use of alternative fuels such as coal, bitumen, petcoke, vacuum residuals and asphaltenes to reduce OPEX is impeded by the substantial CAPEX increase to install technologies such as gasification and drum boilers (e.g. circulating fluidized beds and direct fired boilers). The use of alternative dirty fuels also requires emission reduction equipment (e.g. selective catalytic reduction and selective non-catalytic reduction of NOx, low NOx burners or flue gas recirculation to limit the formation of NOx; flue gas desulfurization to remove SOx; and electrostatic precipitation or filtration of particulate matter). Still further, present and anticipated regulations on carbon dioxide emissions will result in the necessary capture and sequestration of carbon dioxide.

Water Consumption

Existing in-situ and mining techniques used to extract heavy oil also consume significant amounts of fresh surface and fresh/brackish deep well water per barrel of production. The production facilities generally reject water contaminated with concentrated total dissolved solids (TDS) and total suspended solids (TSS) from the production process as the additional OPEX and CAPEX makes treating this water for reuse is commercially unfeasible. This results in the accumulation of large quantities of polluted tailing pond water, typically containing 500 ppm of more of toxic water soluble hydrocarbons, with long term ecological consequences.

Zero liquids discharge through evaporation and crystallization is technically proven but is both CAPEX and OPEX intensive. There is also a great deal of water consumed in the reservoir through reservoir losses (i.e. thief zones), voidage replacement (voids created when oil is produced from the reservoir) and from boiler water blowdown. In the event that lower cost alternative fuels are used, significant increases in water consumption are likely regardless of the techniques used for fuel combustion. Atomization or emulsification of liquid fuels utilizes additional water that becomes steam that is lost through the flue gas. The flue gas desulphurization (FGD) and electrostatic precipitation (ESP) required with alternative fuels requires water, which is also lost in the flue gas itself, or by way of blowdown from the FGD and ESP systems.

Capital Expenditures

The CAPEX involved in in-situ production facilities per barrel of oil is substantially higher than other conventional oil production facilities. The total CAPEX of in-situ production facilities requires a large initial CAPEX followed by sustaining CAPEX. The initial CAPEX has the most dramatic impact on the rate of return for a project as expenditures on the field, central plant, and infrastructure facilities start years prior to the production of the first barrel of oil. The sustaining CAPEX is required throughout the life of an Oil Sands development to maintain production levels at the nameplate (i.e. design throughput) of the production facility. The sustaining CAPEX includes additional drilling and completions of steam injection and production wells, along with the necessary surface facilities (well pads and pump stations) and pipelines (steam, emulsion, vapour and lift gas) to tie the additional production into the existing central production facilities (CPF). At the CPF, where the majority of the initial CAPEX is expended, there are additional facilities in comparison to conventional oil production. The facilities that are installed include the various vessels, tanks, heat exchangers, pumps, compressors and steam generators to:

separate gas/vapour, produced water and bitumen returned from field production; treat the produced water to produce BFW (boiler feed water);

heat integration with production fluids and gases coming back from the field; generate steam using the BFW; and capture, compress, purify, dehydrate carbon dioxide and transport it for use in enhance oil/gas recovery or disposal by sequestration (Carbon capture and Storage).

Diluents, as mentioned above, are required for bitumen separation and dehydration for pipeline transportation to the upgrader/refinery. The "bottom of the barrel" of heavy oil (defined by highest boiling points on distillation curve and molecular weights) of bitumen is predominately asphaltene and resins, of which a portion thereof ends up as a low value stream of upgrader/refinery bottoms. Partial upstream physical separation and upgrading of the bitumen in the field substantially closes the discount margin between the upgraded bitumen and the conventional oil price benchmarks. As a result, the upgrading of the bitumen and separation from the upgrader bottoms results in sales which can be transported with a substantial decrease in the amount of diluent required for blending (potentially negating the requirement of diluent altogether with a highly upgraded crude). The asphaltenes and resins contribute greatly to the low API gravity, high TAN (total acid number), high carbon residue, high sulphur content and high metals content (vanadium and nickel) of the overall bitumen barrel. By removing the asphaltene and resins, the remaining sales oil quality will have been substantially improved. The physical separation or upgrader bottoms can then be used as an alternative fuel to natural gas due its low cost and on site availability. There are several proven physical separation technologies such as solvent deasphalting, atmospheric/vacuum distillation; upgrading technologies such as delayed coking visbreaking and hydrotreating as well as many other new technology initiatives intended to create upstream partial upgrading solutions for the in-situ and mining operations.

Known systems partially address some of the aforementioned problems. For example, US Patent Application No. 2006/0243448 (now issued to U.S. Pat. No. 7,341,102) describes a flue gas injection system for heavy oil recovery. The basic concept of this system is a variation of a well studied oxyfuel concept where the flue gas that is not re-circulated back to the inlet of the boiler is treated and then compressed for use in enhanced gas recovery. The recirculation of flue gas to the inlet of the boiler is required to dilute oxygen that is separated in an air separation unit and then injected into the boiler. This allows a flue gas stream which has a higher volume percentage of $CO_2$ relative to that of a boiler using normal combustion air. The heating of boiler feedwater to make steam is done indirectly in a conventional drum boiler or oilfield OTSGs (once through steam generator). The products of combustion (flue gas) and the steam are separate streams, with different temperatures and pressure with a separate set of different processes that lead to the streams going to potentially separate reservoirs by different reservoir completions.

U.S. Pat. No. 4,498,542 describes a direct contact low emission steam generating system and method utilizing a compact, multi-fuel burner. This system directly contacts the products of combustion with boiler feedwater. The saturated gas is used for thermal stimulation of petroleum wells through the injection of high pressure steam and combustion gas mixtures. The system makes use of three stages including: 1) combustion of fuel and oxidant air; 2) mixing with a boiler feedwater; and 3) separation of the water from the steam and combustion gases to form a 50% non-condensable combustion gas and 50% steam by mass. This system, by using oxidizing air in lieu of oxygen produced from an air separation unit, results in a significant increase in the amount of non-condensables in the high pressure steam and combustion gas mixtures. Moreover, this system describes boiler feedwater passing into the direct fired steam generator to either the petroleum well as steam or contaminated carry over water that leaves the system to an unknown location. The boiler feedwater comes from an unknown source.

U.S. Pat. No. 4,546,829 describes an enhanced oil recovery process wherein high pressure combustion products are generated that are used for indirect heating of boiler feedwater for the purposes of making steam for downhole injection or for utility use. The high pressure combustion products can then be cleaned of solids, treated, cooled and stripped of $CO_2$ prior to downhole injection. Separate streams of nitrogen, $CO_2$, and steam are generated separately for selective mixing prior to introduction at the petroleum reservoir. This system, by using oxidizing air in lieu of oxygen produced from an air separation unit, results in a significant increase in the amount of non-condensables to steam generated.

PCT patent application No. WO2008097666 ("Hot Fluid Recovery of Heavy Oil with Steam and Carbon Dioxide"), describes an enhanced method of heavy oil recovery through use of wet combustion and a combination of products of combustion and steam generated through direct addition of treated water or steam to a flue gas. $CO_2$, superheated steam and combustion gases are all injected into a hydrocarbon formation. The combustor and the steam generator are combined into one chamber, and the method allows for high temperature oxy-combustion and simultaneous injection of steam and $CO_2$, However, the single chamber combustor limits the method's ability to segregate undesirable gases, solids and other products from entering the extraction step which has the potential to interfere with the extraction process or damage the pipes or hydrocarbon-containing formation (e.g. acid corrosion of piping from sulphuric/sulphurous acid.

There is no provision for capture of sulfur and other acid forming gases through direct contact of the combustion products with water in order to remove them from the system as a solid, nor is there provision for recirculation of untreated produced water for further generation of steam. This is also no provision for the removal of solids from the walls of the combustor/steam chamber with a liquid stream which would tend to cause clogging or performance changes in the system. This may restrict the method from the use of many alternative fuels, especially those containing substantial quantities of inorganic solids.

US patent application No. 20070202452 ("Direct Combustion Steam Generator"), describes a method of spiraling vortex fluid addition of combustion gases generated in a spiral chamber to water in order to generate steam, and use of oxygen in the combustion process. However, the method does not provide for use of produced water for steam generation, nor does it discuss the injection of combustion gases along with steam into a hydrocarbon containing matrix or reservoir or the separation and capture of pressurized carbon dioxide after interaction with the hydrocarbons. The method is limited to gaseous and liquid fuels because there is no means to handle the solids.

Methods and systems to overcome the afore-mentioned problems with the prior art are required for the economic production of heavy oil from oil sand with reduced environmental impact.

Industry Trends

Important industry trends are developing as a result of government regulations for the reduction of green house gas emissions through carbon dioxide capture and sequestration. Future trends will be to reduce CAPEX and OPEX of these heavy oil facilities when market forces bring lower oil prices and thus lower rates of return. In areas where there is a high density of mining and in-situ production facilities, water has become a scarce resource and thus has drawn national and world media attention. Special interest groups have and will continue to lobby government/regulatory agencies to stem further development of production facilities in those areas where water is not available or its use for heavy oil production will result in environmental damage.

There are concerns by industry, governments and special interest groups that the use of the valuable more environmentally friendly natural gas in heavy oil production is not in the best interest of the environment and the consumer.

As a result of the foregoing problems, there has been a need for a system and method that improves the operational and capital expenditure efficiency in the recovery of bitumen that is environmentally an improvement over past methodologies. In other words, there has been a need for a system that has both the positive commercial (lower CAPEX and OPEX) and regulatory (provides lower emissions) attributes and promotes its initial implementation and eventual proliferation throughout the industry. The proliferation would be in application for new and existing facilities. Potentially, the OPEX savings could warrant the replacement of existing higher OPEX steam and water treatment plant technologies especially in a carbon constrained environment.

Methods and systems to overcome the afore-mentioned problems are therefore required to enable more economic production of heavy oil with minimal environmental impact.

SUMMARY OF INVENTION

The present invention seeks to overcome, or mitigate, above mentioned problems of known systems and methods, or at least provide an alternative.

Systems and methods are provided for low emission hydrocarbon recovery, and more particularly systems and method for in situ heavy hydrocarbon production, and production of heavy oil or bitumen from mined materials, with reduced emissions and reduced environmental impact.

A first aspect of the invention provides a method of extracting a hydrocarbon from a hydrocarbon bearing matrix material comprising the steps of: (a) generating a compound heat medium comprising fuel combustion products, carbon dioxide and steam at elevated temperature and pressure by steps of: in a first stage combusting a fuel in the presence of an oxidant and a moderator to create products of combustion at an elevated temperature and pressure comprising carbon dioxide; in a second stage contacting a steam generating medium with said products of combustion at elevated temperature and pressure, to generate steam; (b) delivering the compound heat medium at pressure to the hydrocarbon bearing matrix material thereby condensing steam and heating and mobilizing a portion of hydrocarbons; (c) recovering under pressure a mobilized portion comprising hydrocarbons, and carbon dioxide, and separating pressurized carbon dioxide from the mobilized portion.

In the second stage, contacting the steam generating medium with said products of combustion may comprise injecting the steam generating medium, evaporating a portion of the steam generating medium to form steam, and accumulating a reservoir of unevaporated steam generating medium. A portion of the accumulated steam generating medium may be delivered to the combustor to provide a portion of the moderator. If the moderator comprises combustibles, they are combusted in the first stage, and products of combustion may include non-combustible solids from the moderator.

The compound heat medium comprises mainly carbon dioxide and steam with other combustion products. The method has particular application to heavy hydrocarbon recovery.

Beneficially, the process is carried out at a pressure of greater than 100 kPa above ambient and pressurized carbon dioxide is separated from the mobilized portion at a similar pressure, i.e. greater than 100 kPa above ambient pressure, thereby facilitating further processing of the recovered carbon dioxide. If required the recovered carbon dioxide may be further compressed, purified and dehydrated for subsequent processing, such as enhanced oil recovery, enhanced gas recovery, sequestration, or other tertiary oil recovery process. Where the mobilized portion comprises aqueous condensate, aqueous condensate may also be recovered from the mobilized portion, to provide, for example, at least part of a moderator or a steam generating medium. For example, the hydrocarbon, e.g oil, may be recovered as a hydrocarbon/water mixture or emulsion. Carbon dioxide may also facilitate mobility of hydrocarbons through dissolving the carbon dioxide in the hydrocarbons thus causing a reduction of viscosity.

At least a portion of the steam and carbon dioxide from the compound heat medium may be retained in the hydrocarbon matrix through re-pressurization of adjacent reservoir zones, voidage replacement and leakage to adjacent strata. Preferably a significant portion, e.g. over 50%, of the carbon dioxide, delivered to the hydrocarbon bearing matrix is recovered. In some processes over 90% of the carbon dioxide may be recovered.

The method also provides for recovery from the compound heat medium of particulates originating from the fuel, and for recovery of dissolved or suspended solids which are captured and recovered from the steam generating medium, as slag.

The mobilized portion of hydrocarbons may further comprise one or more of dissolved and suspended solids and water soluble hydrocarbons and the method comprises after recovering produced water comprising said dissolved or suspended solids and water soluble hydrocarbons, injecting said produced water at step a) as one or both of a moderator or steam generating medium, thereby combusting the water soluble hydrocarbons and separating the suspended and dissolved solids from the steam generating medium.

A second aspect of the invention provides a system for extracting a hydrocarbon from a hydrocarbon bearing matrix material, comprising: a compound heat medium generator comprising: a first zone for oxy-combustion of a fuel in the presence of an oxidant and a moderator to create products of combustion at an elevated temperature and pressure comprising carbon dioxide, the combustion zone having inputs for fuel, oxidant and moderator, and an output for directing products of combustion to a second zone the second zone for contacting a steam generating medium with said products of combustion at elevated temperature and pressure, to generate steam, thereby generating a pressurized compound heat medium comprising products of combustion, carbon dioxide and steam at elevated temperature; and outlet means from the second zone of the compound heat medium generator for coupling the compound heat medium generator to an injection means for delivering the compound heat medium at pressure to the hydrocarbon bearing matrix material, thereby condensing steam and heating and mobilizing a portion of hydrocarbons; and a separation system for coupling to recovery means for recovering under pressure a mobilized portion comprising hydrocarbons, and carbon dioxide, and separating pressurized carbon dioxide from the mobilized portion.

Another aspect of the invention provides a system for extracting a hydrocarbon from a hydrocarbon bearing matrix material comprising: a first connection means for coupling to a injection well head; a second connection means for coupling to a production wellhead; a compound heat medium generator comprising: a first chamber for oxy-combustion of a fuel in the presence of an oxidant and a moderator to create products of combustion at an elevated temperature and pressure comprising carbon dioxide, the first chamber having inputs for fuel, oxidant and moderator and an output for directing products of combustion to a second chamber; the second chamber, for contacting a steam generating medium with said products of combustion at elevated temperature and pressure, to generate steam, thereby generating a pressurized compound heat medium comprising products of combustion, carbon dioxide and steam at elevated temperature; and first output means connecting the second chamber of the compound heat medium generator to the first connection means for delivery of the compound heat medium at pressure to the hydrocarbon bearing matrix material thereby condensing steam and heating and mobilizing a portion of hydrocarbons; and a separation system having input means connected to the second connection means, the separation system for recovering under pressure a mobilized portion comprising hydrocarbons, and carbon dioxide, and separating pressurized carbon dioxide from the mobilized portion.

Embodiments of the system may be used for in situ recovery or recovery of hydrocarbons from mined material.

Preferably, the system provides for recycling of recovered produced water or carbon dioxide into the first zone as a moderator or into the steam generation medium in the second zone. A particulate separation system, i.e. a scrubbing system (preferably one or more of a cyclone scrubber, Venturi scrubber and/or wet scrubber) may be provided for particulate separation from the compound heat medium. An air separation unit may be provided for more economical local generation of oxidant for combustion, in lieu of conventional centralized cryogenic air separation. This unit is preferably a ceramic authothermal recovery (CAR) unit, where a portion of the compound heat medium is used for oxygen desorption.

Advantageously, to facilitate gravity assisted separation of solids and condensates, the compound heat generator has a vertical configuration with the first zone located above the second zone, and a sump in a third zone underneath the second zone is provided for recovering solids, such as ash and slag, that settle from the steam generating medium.

Thus systems and methods for heavy hydrocarbon production, from a reservoir or mined material, are provided that are more economical and provide improved recovery and reuse of water and carbon dioxide, to reduce emissions and other environmental impact. Advantageously, the combustion zone is heated with oxygen combustion and can attain a relatively high combustion temperature as compared to combustion with air alone. Such combustion preferentially exceeds the melting temperature, or slag temperature, of the dissolved or suspended solids (e.g. alkali salts e.g. NaCl, KCl, and the like, alkaline metal salts, e.g. $CaCl_2$, $MgCl_2$, and the like, and silicates and silicate compounds such as aluminosilicates and the like), in the fuel slurry/emulsion or other aqueous mixtures added to the combustion mixture. Exceeding the melting temperature of the majority of these solids provides an advantage in that the solids are then dewatered and accumulate in the combustor as slag which is then quench in the evaporator and sump. This can facilitate the removal of the solid slag materials by collection in the sump and removal from the system in the slag removal and handling system.

The use of limestone added to the combustion zone via a water slurry either combined with a fuel slurry/emulsion, as a component of the moderator flow or as a separate flow can advantageously result in the reaction to form lime (i.e. $CaCO_3 + Heat \rightarrow CaO + CO_2$). The reaction is known from the prior art to typically occur at temperatures of less than 1000° C. which should be readily obtainable in the combustion zone of the combustor, especially if oxycombustion is utilized. The lime (CaO), as a product of combustion can be atomized within the combustion zone and which can then interact with the steam generating medium. After being absorbed or dissolved by the steam generating medium, it will then react inside the steam generating medium to form the alkaline earth metal hydroxide ($Ca(OH)_2$). This alkaline earth hydroxide is very reactive with acids such as sulphurous or sulphuric or nitric acid (the acidic products of the combustion reaction of sulfur and nitrogen content in the fuels with the steam generating medium). This acid-base reaction will form sulfite, sulfate and nitrate salts respectively when water is removed from the sump as blowdown or through the slag removal and handling system allowing the further concentration of these potentially useful salts for subsequent processing or disposal as dewatered solids. Alternatively, the lime can be added directly to the steam generating medium for reaction with the acids formed from the sulfur and nitrogen in the fuel. Other carbonate or alkali forming compounds (e.g. $NaHCO_3$ or other alkali or alkaline earth metal carbonates, bicarbonates or hydroxides and the like) as previously known in the art, can also be used to provide a method for neutralizing the acid products of combustion in the steam generating medium.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

FIG. 8 shows a table of results of an engineering study that was conducted on the surface facilities comparing the advantages of an embodiment of the present invention, referred to as ZEIP, over Prior Art SAGD; and FIG. 9 shows a graph of bitumen viscosity vs. temperature.

DESCRIPTION OF PREFERRED EMBODIMENTS OF THE INVENTION

With reference to the figures, embodiments of systems and methods will be described with application for low emission hydrocarbon recovery. In particular systems and method are provided for in situ hydrocarbon production, and production of heavy oil, or other hydrocarbons, in situ or from mined materials. The systems and methods described are both commercially advantageous and environmentally superior over past methods of hydrocarbon recovery.

Figure 1:
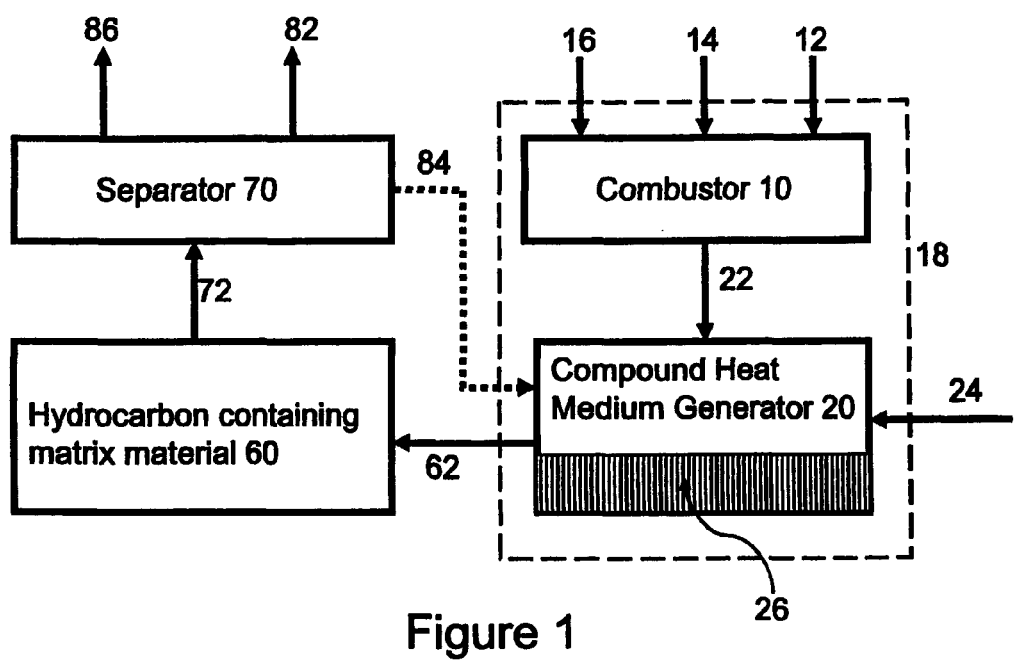
FIG. 1 shows simplified schematic block-flow diagram overview of a system and method in accordance with a first embodiment of the invention.

As shown in FIG. 1, a first embodiment of the system 100, comprises compound heat medium generating system 18, having a first chamber or zone, i.e. combustor 10, which receives a fuel 12 (e.g. naturally occurring fossil fuels such as natural gas, anthracite, coal, sub-bituminous coal, lignite, and peat; hydrocarbon derived fuels such as atmospheric or vacuum residuals, asphaltene, pitch, char, and coke; refuse derived fuels such as wood waste; municipal solid waste such as sewage; synthetic fuels such as syngas, or mixtures thereof) together with a moderator 14 and an oxidant 16. The fuel is combusted in the combustor 10 with the oxidant 16 in the presence of the moderator 14 to produce products of combustion 22 comprising $CO_2$ at an elevated temperature and pressure. Other products of combustion, such as unburnt carbon, SOx, NOx, and partially-oxidized molecules are also possible components of the products of combustion especially when alternative fuels are utilized. If the residence time in the combustor 10 is insufficient or the fuel to oxidant or moderator ratios are non-ideal, a higher percentage of unburnt carbon components is likely.

The products of combustion 22 are directed to a second chamber or zone referred to as the evaporation zone or compound heat medium generator 20 (CHG), containing a steam generating medium 26. In this zone, the hot products of combustion contact 22 the steam generating medium 26, evaporating a portion of the steam generating medium to generate steam, while unevaporated steam generating medium is collected or accumulated in the reservoir 26. Untreated Boiler Feed Water 24 (BFW) may also be added to the evaporation chamber 20, and recovered produced water 84 is also added to the CHG to form a portion of the steam generating medium 26. Thus, the steam generating medium 26 is at least partially evaporated by the products of combustion 22 to form a compound heat medium 62 (CHM) comprising saturated steam and $CO_2$ at an elevated temperature and pressure. The CHG 20 and the combustor 10, may be separate chambers as shown or optionally may be contained in one combined vessel 18, which may be a pressure vessel. Preferably combustion and generation of the CHM take place at pressures of greater than 100 Kpa above ambient.

The heated and pressurized CHM is directed towards a hydrocarbon bearing matrix material 60, e.g. an underground reservoir, e.g. via injection means at an injection wellhead, to condense some of the steam in the CHM to heat and mobilize a portion of the hydrocarbons in the matrix 60. The recovered portion 72 comprises mobilized hydrocarbons, aqueous condensate comprising condensed steam (produced water) and $CO_2$, and is recovered from the hydrocarbon bearing matrix material, e.g. at a producer wellhead, and directed to a separator 70. The separator separates hydrocarbons 86, $CO_2$ 82 and produced water 84 from the mobilized portion. Beneficially, a portion of the produced water 84 may optionally be directed back to the CHG to form a portion of the steam generating medium 26.

Figure 2:
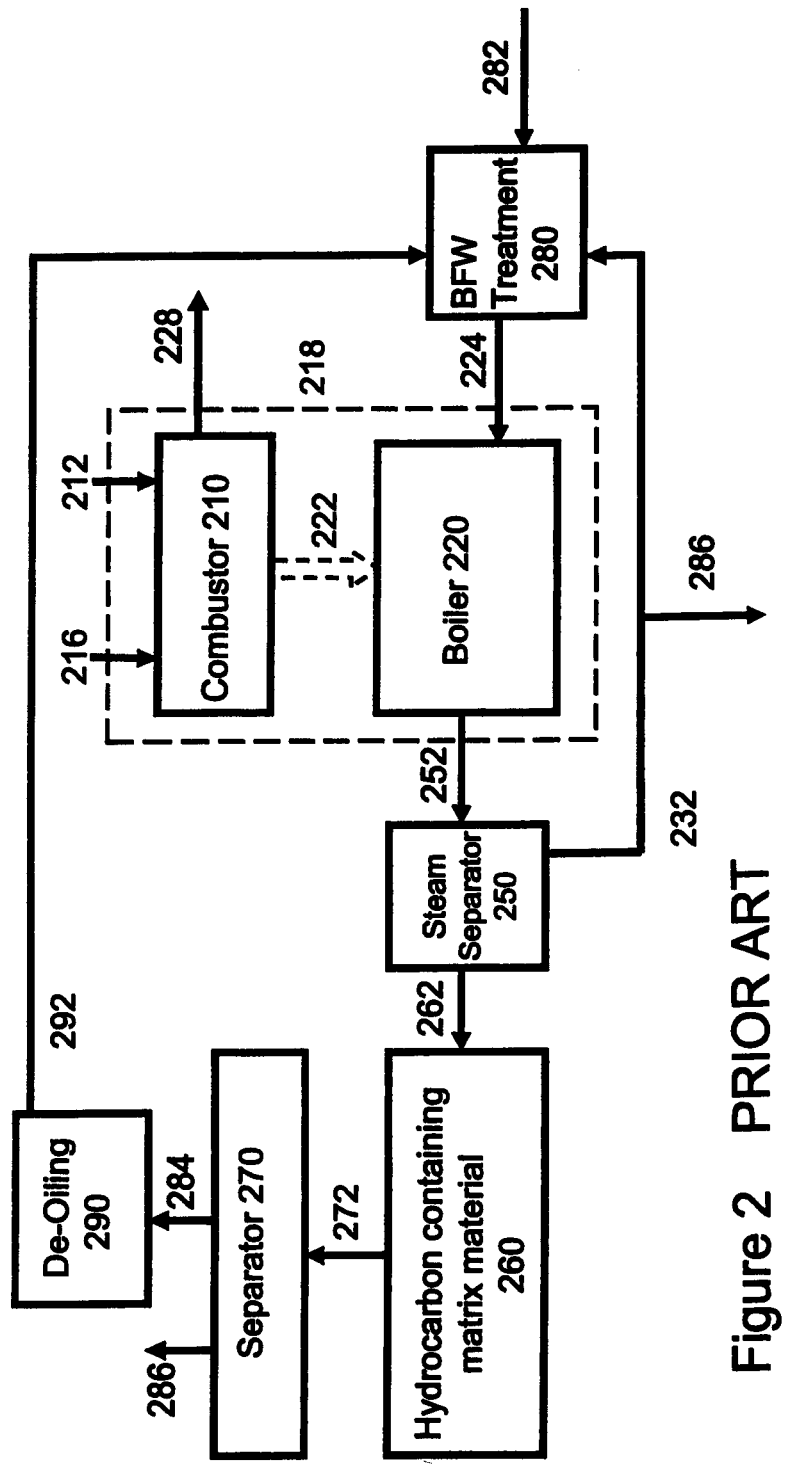
FIG. 2 (Prior Art) shows a schematic block diagram of Steam Assisted Gravity Drainage (SAGD)

For comparison, FIG. 2 shows schematically a prior art SAGD method for extraction of hydrocarbons from hydrocarbon bearing matrix material 260. A combustor 210, receives fuel 212 (usually a clean fuel, e.g. natural gas) and oxidant 216 (usually ambient air) and combusts the fuel with the oxidant to form products of combustion 228 and heat 222 usually at a pressure usually at a pressure in excess of 100 kPa of ambient pressure. The heat is directed to a boiler 220 (usually across a radiant or convective heat exchange surface) and the products of combustion 228 are vented as flue gas usually comprising significant quantities of waste heat, $CO_2$ and water of combustion.

In the boiler 220, treated BFW 224 entering the boiler is evaporated from addition of heat 222 to form wet steam 252. The wet steam 252 is directed to a steam separator 250. A portion of the BFW is not evaporated and accumulates the dissolved solids, suspended solids, oil and grease, and organic carbon and it is continuously removed as blowdown 232. A portion of this blowdown 232 is circulated back to water treatment 280 and a portion of this blowdown is sent to water disposal 286. The combustor 210 may optionally be contained in the boiler 220 as one unit 218.

In the BFW treatment step 280, untreated BFW make-up water 282 and deoiled produced water 292 treated in the BFW treatment plant 280 to form treated BFW 224. In the steam separator 250, dry steam 262 is separated out from unevaporated BFW 286 which is usually returned to the BFW treatment plant 280. Dry steam 262 is directed towards the hydrocarbon containing matrix material 260. In the hydrocarbon containing matrix material 260, the dry steam 262 mobilizes a portion of the hydrocarbons by condensing on it and thus transferring heat to it. The mobilized portion of the hydrocarbons 272 along with some of the condensed steam (water) is directed to a separator 270. In the separator 270, hydrocarbons 286 are separated out, and oily produced water 284 (containing dissolved solids, suspended solids, oil and grease and organic carbon) is sent to de-oiling 290. De-oiled produced water 292, is sent for BFW treatment 280.

Thus, it will be appreciated that in comparison with conventional SAGD processing, the system and method according to embodiments of the present invention significantly reduces emissions and water treatment and usage requirements, by improved recycling, reuse and recovery as will be described in more detail below.

Figure 3:
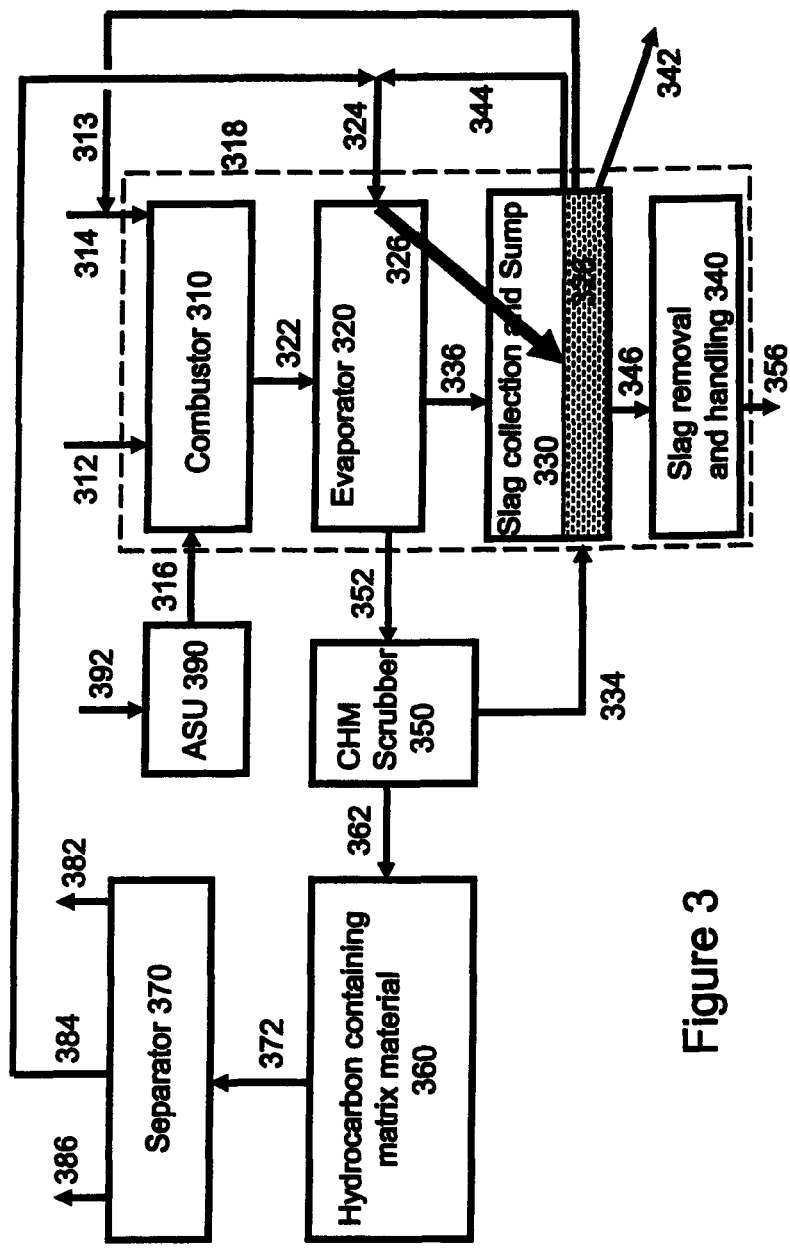
FIG. 3 shows a schematic block flow diagram representing a method and system according to another embodiment of the invention.

Thus, in FIG. 3 a more detailed embodiment of the inventive method and system is shown, wherein the CHG 318 comprises a combustor zone 310, an Evaporator or evaporation zone 320 and a separation zone, referred to a Slag collection and Sump 330.

In FIG. 3, the combustor (or combustor zone) 310 combusts fuel 312 in the presence of a moderator 314 and an oxidant 316. The oxidant 316 may optionally be produced by an air separator unit (ASU) 390 which uses air 392 to produce oxidant (primarily composed of oxygen). The combustor 310 produces products of combustion 322 comprising $CO_2$ and typically containing significant quantities of super heated steam from the water in the fuel, in the moderator and of the combustion of the hydrogen-containing fuels. Products of combustion 322 from the combustor may also produce solid particles resulting from combustion of the fuel bound ash (inorganics) or inorganic suspended or dissolved solids in the moderator. A majority portion of the moderator 314 is preferably composed of sump moderator water 313 which may be delivered directly to the combustor 310. The sump moderator water 313, typically containing significant concentrations of dissolved or suspended inorganic solids, oil and grease and organic carbon, forming a portion or most of the moderator 314, is preferably combusted to completion in the combustor 310. The combustion temperature is preferably controlled above the melting temperature of some of the inorganic dissolved or suspended solids in the moderator or contained within the ash in the fuel to produce a liquid slag that can be discharged from the combustor by gravity or by pressure. The moderator controls the temperature of combustion of the combustion products 322 preferably lowering the temperature of the combustion to extend the operating life of the system or to reduce the chance of catastrophic failure as known from the prior art. The products of combustion 322 at an elevated temperature and pressure are directed towards an evaporator (or evaporator zone) 320.

In the evaporator zone 320, the products of combustion 322 directly contact steam generating medium comprising producer water 384 or sump water 344, which is introduced into the evaporator zone 320 at 324. Part of the steam generating medium is evaporated to create steam, and the unevaporated portion accumulates in a reservoir of steam generating medium in the slag collection and sump zone 330. The steam generating medium 326 may additionally be formed by accumulation of unevaporated produced water 384 and/or unevaporated sump water 344 in the slag collection and sump (or slag collection and sump zone) 330. Both the untreated produced water 384 and the sump water 344 may be combined with a stream 324 which may comprise BFW, that is directly contacted by the products to combustion 322, thereby generating the compound heat medium 352, which at this point is in unscrubbed form (i.e. may contain particulates). Preferably, a portion of the BFW stream 324 is evaporated by the products of combustion 322 before forming a reservoir of non-evaporated steam generating medium 326 in the slag collector and sump 330. A portion of the unevaporated steam generating medium 326 or BFW stream 324 may optionally be directed to prevent the deposition of solids which would otherwise form on the walls of the system and deliver them to the reservoir of accumulated steam generating medium 326 in the slag collector and sump 330. These solids may join the slag and be disposed in a later stages. Additional steam may evaporate from the steam generating medium after it has entered or accumulated in the Slag collector and Sump 330. The evaporated steam generating medium forms an unscrubbed compound heat medium (CHM) 352 comprising saturated steam and $CO_2$ which is directed towards a CHM scrubber 350.

Unevaporated steam generating medium accumulated in the Slag Collector and Sump 330, usually contains dissolved or suspended inorganic solids, oil, grease and organic carbon. A blowdown stream 342 from the Slag Collector and Sump 330 is preferably used to remove some of the water and dissolved or suspended materials from the sump and is sent to water treatment in a central plant while other dissolved or suspended materials in the reservoir 326 is delivered as sump moderator water 313 to the combustor 310. Mostly solid slag material 346 may be removed from the bottom of the Sump 330 to a slag removal and handling zone 340 under pressure.

The solid slag material, typically being of higher density than the remainder of the accumulated steam generating medium will tend to a settle to the bottom of the slag collector and sump 330. This solid material, usually comprising undesirable materials such as silicates, sulphates, nitrates and metal oxides (e.g. oxides of nickel and vanadium) and the like can be removed from the slag collection and sump 330 through prior art methods to the slag removal and handling chamber (zone) 340. The solid material can then be removed from the system as largely dewatered slag 356 (typically at ambient pressure).

The CHM will likely contain a much lower concentration of products of combustion other than $CO_2$ and steam (e.g. SOx, NOx, particulates) than the gas leaving the combustion zone 322 since most of the other products of combustion will tend to interact with the steam generating medium 326 and be removed to the sump 330. Other products of combustion such as unburnt carbon, will tend to be lighter than the solids and slag that enter the reservoir of unevaporated steam generating medium 326 and will tend to remain near the surface of the reservoir. They are then more available to be recirculated to the sump moderator water 313 and to be recombusted in the combustor 310, thus providing an effective decrease in the amount of unburnt carbon which is discharge from the system and to provide a means by which the fuel retention time in the combustor can be minimized to less than 100% burnout.

In the particulate separation unit, i.e. CHM Scrubber, 350, the unscrubbed CHM 352 is subjected to various purification processes (preferably at least one or more of a Cyclone scrubber, a Venturi Scrubber, and a Wet Scrubber). Dirty condensate is returned from the CHM Scrubber 350 to the Sump 330 as CHM scrubber return water 334. Scrubbed CHM 362, containing $CO_2$ and steam, is directed towards the hydrocarbon containing matrix material 360. When the oxidant is relatively pure oxygen, the CHM will typically contain very little else other than $CO_2$ and steam even when the products of combustion contain large quantities of other products of combustions (such as SOx and NOx) because of the effective removal of these undesirable components via the sump, slag removal and combustor moderator process described above.

In the hydrocarbon containing matrix material 360, the scrubbed CHM 362 condenses on, heats and mobilizes a portion of the hydrocarbons to produce a mobilized portion 372. This mobilized portion 372 also comprises condensed scrubbed CHM (water) and $CO_2$ which is directed towards a separator 370.

In the separator 370, hydrocarbons 386 are separated out from $CO_2$ 382 and untreated produced water 384. At least a portion of the untreated produced water 384 is directed back towards the evaporator 320 to form a portion of the steam generating medium 326.

The use of evaporation of the produced water 384 and combustion, slagging and evaporation of the sump moderator water 313 combined with solids removal in the sump 330 and the sump removal and handling zone 340 significantly reduces the overall CAPEX, chemical and energy cost of water treatment as compared to the prior art. This is because a majority of the energy cost for water treatment is provided for "free" as part of the process of producing the CHM. This is especially relevant when dirty fuels containing large quantities of incombustible ash components such as silicates or metals are used since these can be more easily be removed as slag than in prior art methods. The net amount of water required for the process is significantly reduced because most or nearly all of the water of combustion is contained within the products of combustion 322 which forms part of the CHM.

Figure 4:
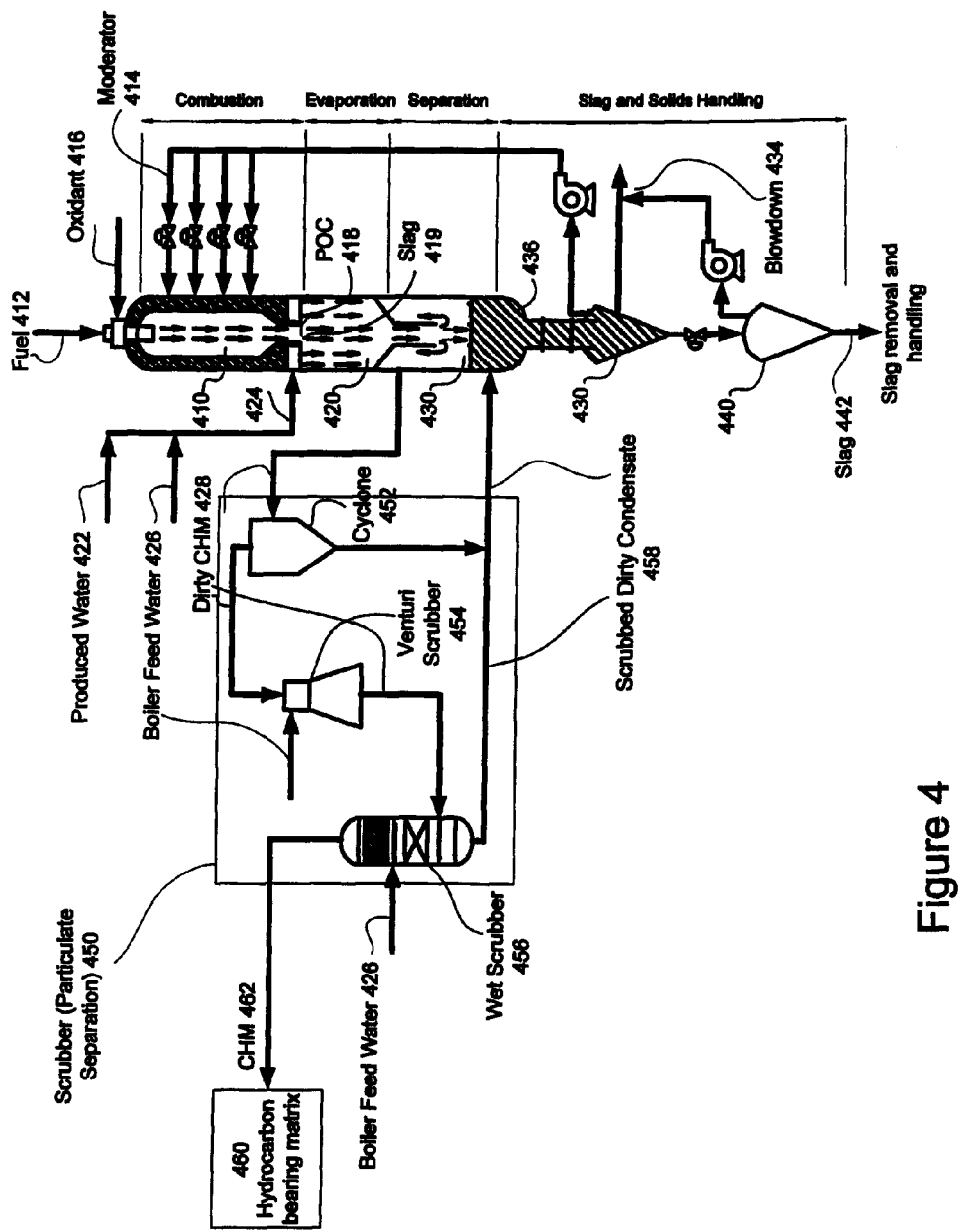
FIG. 4 shows a schematic system and process flow diagram of a compound heat generator and compound heat scrubber according to an embodiment of the invention.

As shown in FIG. 4, an embodiment of the system comprises a combustor 410, an evaporator 420, a slag collection and sump 430, a slag removal and removal and handling 440, and a scrubber system 450. Referring to FIG. 4, core components of this embodiment of the system will be described. The combustor 410 is coupled to an oxidant inlet 416 which is coupled to a source of oxidant. The fuel 412 (slurry/emulsion) is also coupled to the combustor 410 with the fuel 412 (slurry/emulsion) also coupled to a source of fuel and preparation step. The moderator 414 is coupled to the combustor 410 from a reservoir of water from slag collection and sump 430 for combustion temperature moderation. The moderator 414 can alternatively be coupled to a slip stream of compound heat medium 462. The oxidant 416 and the fuel 412 are combusted in the combustor along with any organic carbon and oil and grease that is in the moderator 414. The moderator 414 is injected into the combustor 410 to maintain a minimum temperature (approximately 1500 to 2500 deg. C.) to maintain slag formation of fuel 412 bound ash and moderator 414 inorganic organic solids (dissolved solids and suspended solids). The slag 419 collects in and flows from the combustor 410 by gravity and pressure into the evaporator 420 and then onto the slag collection and sump 430 where its temperature is progressively quenched to form a solid. The products of combustion 418 contains the steam and carbon dioxide from the combustion of the oxidant 416 and the fuel 412 and the steam from the vaporization of the fuel 412 bound water, moderator 414 water and combustion of fuel 412 bound hydrogen. The products of combustion 418 exit the combustor 410 and enter the evaporator 420. The evaporator 420 is coupled to a source of steam generating medium 424 that is preferentially supplied by the produced water 422 but may be substituted from an external source of make-up boiler feed water 426. The products of combustion 418 evaporate a majority portion of the steam generating medium 424 to form a compound heat medium 428. Lime (calcium oxide) in the products of combustion or mixed in the steam generating medium 424 form calcium hydroxide which will in turn react with the SOx and NOx products of combustion impurities (i.e. oxidized fuel bound nitrogen and sulphur) to form nitrates and sulphates that can then be separated in the slag collection and sump 430 or blowdown 434 from the system. The remaining condensate product 436, not evaporated from recovered aqueous condensate 422 and/or boiler feed water 426, is gravity separated from the compound heat medium 428 and enters the sump 430 where it is held in reserve to be used preferentially as moderator 414 circulated to evaporator 420 for further evaporation. The remaining condensate product 436 in the reservoir contains the majority of the impurities from the steam generating medium 424. A portion of the sump 430 reservoir is blowdown 434 from the system to maintain maximum impurity levels in the system and to provide a means of water balance should the produced water 422 exceed the system capacity (i.e. evaporated it as compound heat medium 428). The slag and separable solids by gravity are collected in the slag collection and sump 430 where they are transferred by slag sluice in the Slag Removal and Handling system 440 into ambient pressure and temperature conditions. The slag 442 is then removed from the Slag Removal and Handling system 440 for external disposal. The dirty compound heat medium 428 that exits the evaporator 420 contains impurities (not including steam and carbon dioxide) in both vapour, liquid and solid form. The dirty compound heat medium 428 enters a scrubber system 450 that may consist of one or more of a cyclone scrubber 452 where the free liquid and solid is removed by centrifugal separation; Venturi scrubber 454 where the compound heat medium is washed with clean condensate; and/or wet scrubber 456 where free liquid separation and final wash and mist elimination takes place. The scrubbed dirty condensate 458 is returned to the slag collection and sump.

The clean compound heat medium 462 exits the scrubber system 450 and is sent to the hydrocarbon bearing matrix 460.

Figure 5:
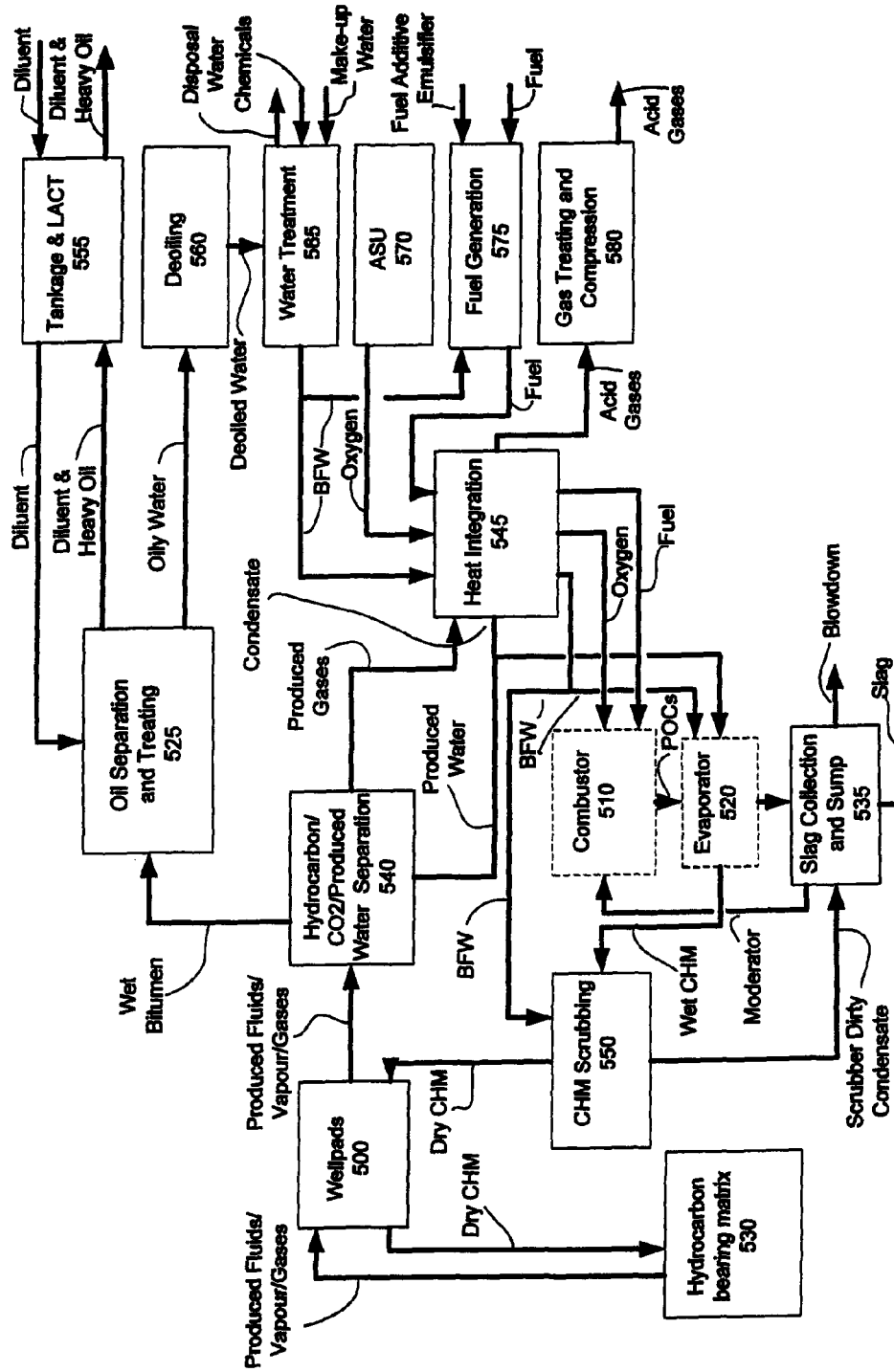
FIG. 5 shows an overall schematic block flow diagram of a system and method in accordance with an embodiment of the invention.

FIG. 5 shows a schematic block flow diagram providing further details of the system in accordance with an embodiment of the invention.

The general operation of the system is described with reference to conventional SAGD production although it is understood that the technology may be applied to other thermal oil recovery techniques such as the extraction of bitumen from oil sand in in-situ or mining as discussed below and as understood by those skilled in the art. In SAGD production of heavy oil, steam is injected continuously and reservoir fluids and gases are produced continuously and simultaneously. The combustor 510 receives fuel, oxygen and make-up boiler feed water from heat integration 545. The combustion temperature is moderated with moderator from slag collection and sump 535. Products of combustion enter the evaporator 520 where it evaporates produced water and make-up BFW into compound heat medium. Slag and blowdown are removed from the slag collection and sump 535 for further processing or disposal. The dirty wet CHM is scrubbed in CHM scrubbing system 550. The clean dry CHM is sent to the wellpads 500. The CHM is sent into the hydrocarbon bearing matrix 530 by steam injection wells. The produced fluids, vapours and gases are produced from the hydrocarbon bearing matrix 530 by production wells. The produced fluids, vapours and gases are sent to hydrocarbon, $CO_2$, and produced water separation 540. The wet bitumen is sent to oil separation and treating 525 where purchased diluent is added to allow gravity separation of heavy oil from oily water to meet sales specifications. The dehydrated diluents and heavy oil mixture is then sent to tankage and LACT (lease automatic custody transfer) 555 for sales. The oily water is sent to deoiling 560 for removal of oil and some suspended solids. The deoiled water from deoiling 560 is sent to water treatment 565 for dissolved solids (silica) removal and hardness removal wherein various chemicals are utilized in the water treatment process.

The water treatment 565 process requires the disposal of waste water that is highly concentrated in dissolved solids. The disposal of water from the process as well as other process losses (e.g. reservoir losses) requires substantial make-up water into the water treatment plant 565 from and external source water well. The BFW from the water treatment plant is sent to both heat integration 545 and for fuel generation 575. The fuel generation 575 receives the fuel, BFW and fuel additives/emulsifiers and prepares fuel slurry/emulsion. This fuel slurry/emulsion is sent to heat integration 545. An ASU enriches oxygen in the ambient air and sends the oxygen to the heat integration 545 under pressure. Produced gases from the hydrocarbon/CO2/produced water separation 540 is sent to heat integration 545 where it is condensed against the incoming BFW, oxygen and fuel slurry/emulsion. The condensate from heat integration is comingled with produced water from hydrocarbon/CO2/produced water separation 540. The remaining acid gas from heat integration 545 is sent to gas treating and compression 580 for compression, cooling, dehydration and purification. The compressed, dehydrated and purified acid gas (CO2) is then sent offsite for uses in enhanced gas recovery and enhanced oil recovery or disposal by sequestration.

Figure 6:
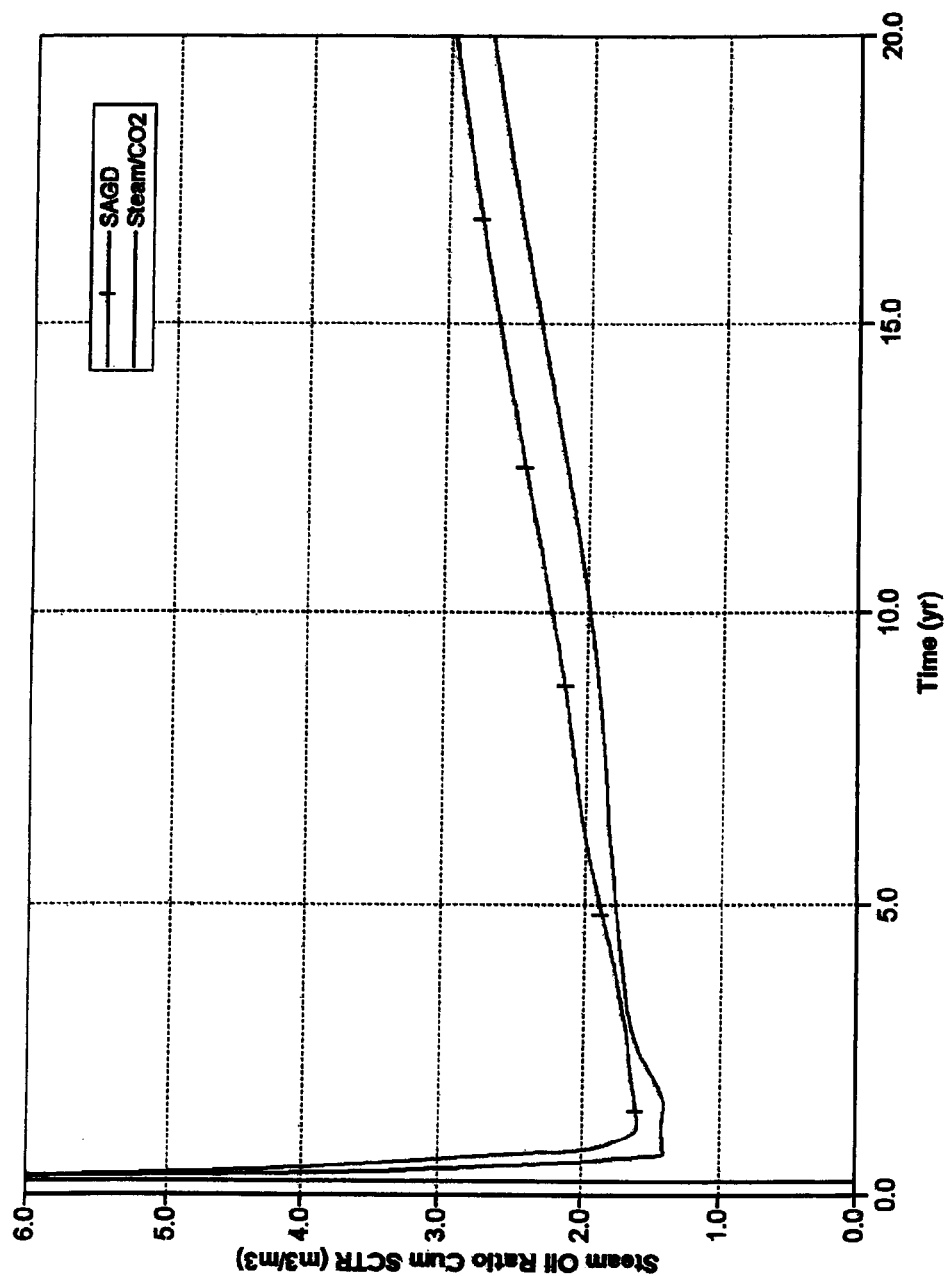
FIG. 6 shows the results of a reservoir simulation comparing the steam oil ratio of Prior Art SAGD with a process according to an embodiment of this invention.

FIG. 6 shows the results of a reservoir simulation comparing the steam oil ratio of Prior Art SAGD with this an method according to an embodiment of the invention. Steam oil ratio SOR is a ratio of the volume of steam injected in cold water equivalent (i.e. as if it were condensed) to the volume of bitumen produced. As the CAPEX and OPEX are all related largely to SOR, so is the SOR related to rate of return and profitability of an operation. As can be seen from the results of the simulation, the SOR is lower for the steam/CO$_2$ CHM then it is for pure steam in Prior Art SAGD. The 2D numerical simulation was conducted on single SAGD well pair (injection and production) using the following typical in-situ Athabasca Bitumen parameters using a maximum steam pressure.

Parameters for Reservoir Simulation
Characteristics of Reservoir

| | |
|---|---|
| Reservoir depth: | 380 m |
| Reservoir thickness: | 25 m |
| Well pair distance: | 100 m |
| Well length: | 750 m |
| Porosity: | 32% |
| Horizontal permeability: | 5.0 Darcy |
| Vertical permeability: | 2.0 Darcy |

Reservoir Initial Conditions

| | |
|---|---|
| Pressure: | 2000 kPa |
| Temperature: | 12° C. |
| Oil saturation: | 75% |
| Irreducible oil saturation: | 15% |
| Water saturation: | 25% |
| Connate water saturation: | 25% |
| Gas Saturation: | 0%? |
| GOR: | Native Reservoir 3.0 |
| | SAGD - 5.0 (incl. Aqua-thermal effect) |

Characteristics of Reservoir Sand

| | |
|---|---|
| Compressibility: | 7.0 × 10−6 kPa − 1 |
| Heat capacity: | 2.39 × 106 J/m3 · C. |
| Thermal conductivity: | 1.728 × 105 J/m · day · C. |

See FIG. 9 for a graph of bitumen viscosity vs. temperature.

Thermal-Physical Properties of Bitumen

| | |
|---|---|
| Molecular weight: | 600 |
| Density: | 1010 kg/m3 (@15° C.) |
| Heat capacity: | 1060 J/mol · C. |
| Thermal conductivity: | 1.24 × 104 J/m · day · C. |
| Viscosity: | 3 × 106 cp @ 9° C. (FIG. 1) |

Thermal-Physical Properties of Water

| | |
|---|---|
| Latent heat (steam): | 40,690 J/mol (@100° C.) |
| Thermal conductivity(liquid): | 5.184 × 104 J/m · day · C. |
| Thermal conductivity(steam): | 1.693 × 103 J/m · day · C. |
| Viscosity: | 0.83 cp (@20° C.) |

Thermal-Physical Properties of CO$_2$

| | |
|---|---|
| Molecular weight: | 44.1 |
| Solubility in bitumen: | 0.4608 mol/kg bitumen (@260° C., 5.1 MPa) |
| Solubility in water: | 0.1887 mol/kg water (@240° C., 5.0 MPa |
| Viscosity of CO$_2$-bitumen mixture: | 3.06 cp (@260° C., CO$_2$ saturated) |
| Injection Conditions | |
| Composition | H2O/CO2 As per proposal |
| Maximum Rate | 600 tonne/day 100% CWE |
| | (cold water equivalent) 100% water |
| | (Pressure control mode with rate limit) |
| Maximum pressure | 5 MPa (down hole wellbore pressure) |

Pressure (MPa)

| Composition | | 5 | 10 |
|---|---|---|---|
| CO2 | % mol | 5.54% | 5.39% |
| H2O | % mol | 94.08% | 94.24% |
| O2 | % mol | 0.00% | 0.00% |
| N2 | % mol | 0.38% | 0.37% |
| SO2 | % mol | 0.20% | 0.20% |
| NOx | % mol | 0.05% | 0.05% |

Figure 7:
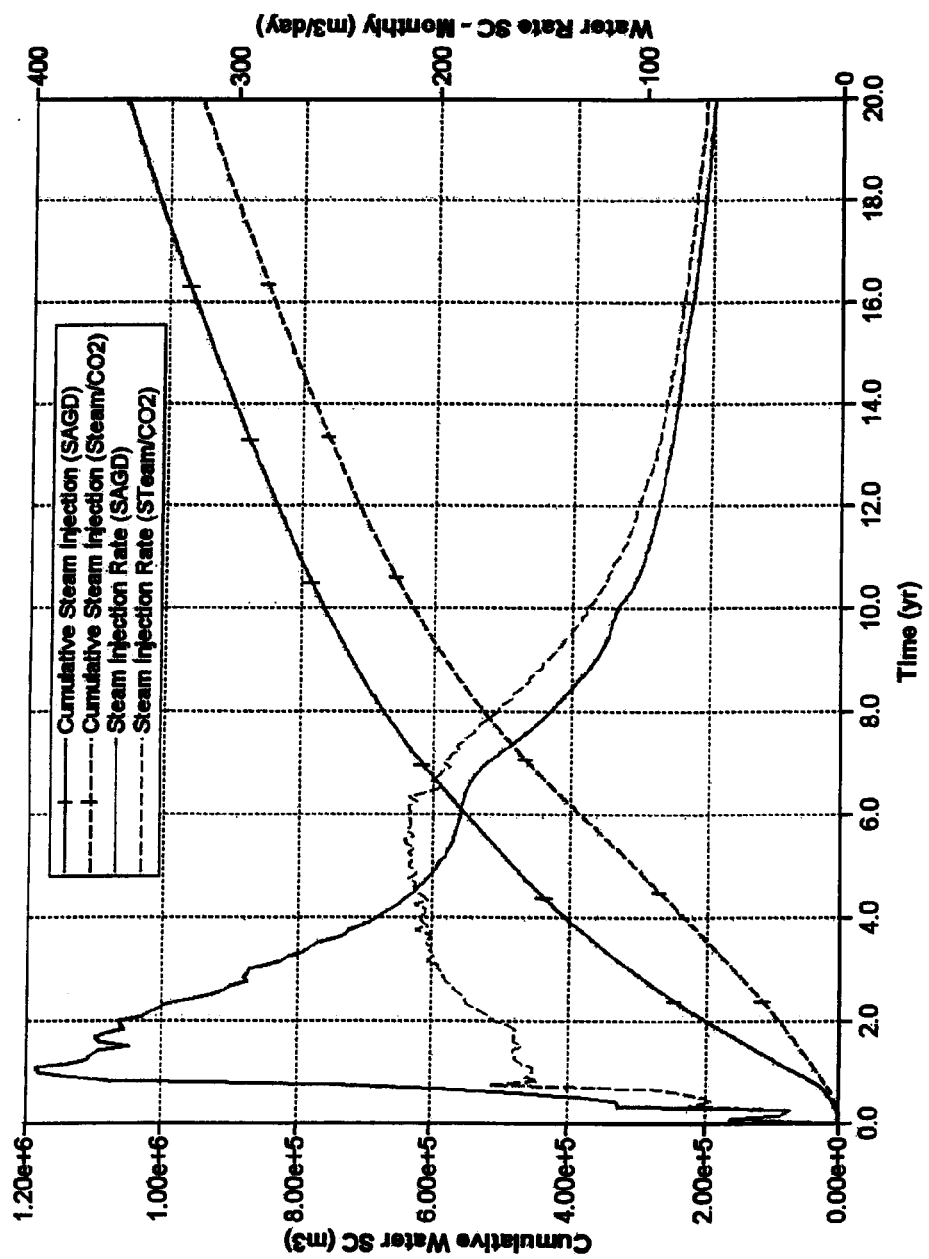
FIG. 7 shows the results of a reservoir simulation comparing the cumulative steam injection and steam injection rate of Prior Art SAGD with a process according to an embodiment of this invention.

FIG. 7 shows the results of a reservoir simulation comparing the cumulative steam injection and steam injection rate of Prior Art SAGD with an embodiment of this invention. Cumulative steam injected is the total steam injected into the reservoir of a single well pair from start of production over the life of the well pair. Steam injection rate is a measure of the amount of steam injected into the steam injector of a single well pair. The results show that this method has a more consistent rate of injection over Prior Art SAGD allowing for more optimized surface facilities, from a design consideration, as there is less deviation from the maximum rates (design) to the average rates on injection and thus production facilities. The reduced cumulative steam consumption of this method over Prior Art SAGD further emphasizes the increased profitability through lower CAPEX and OPEX over the life of a wellpair.

Over the life of the SOR related to rate of return and profitability of an operation. As can be seen from the results of the simulation, the SOR is lower for the steam/CO$_2$ CHM then it is for pure steam in Prior Art SAGD. The 2D numerical simulation was conducted on single SAGD well pair (injection and production) using the following typical in-situ Athabasca Bitumen parameters using a maximum steam pressure. The 2D numerical simulation was conducted on single SAGD well pair (injection and production) using the typical in-situ Athabasca Bitumen parameters specified in FIG. 6.

FIG. 8 shows a table of results of an engineering study that was conducted on the surface facilities comparing the advantages of an embodiment of this invention, referred to as ZEIP, over Prior Art SAGD. A Conceptual Study was completed on a 50,000 barrel of oil per day commercial facility to make the comparison between ZEIP and Prior Art SAGD.

The following deliverables were generated by the engineering study for both cases to substantiate the quantitative comparison: Block Flow Diagrams and associated Mass Balances, Process Flow Diagrams and associated Heat and Material Balances, Mechanical Equipment List, OPEX estimate and CAPEX estimate. The CAPEX and OPEX costs were then normalized between the two cases (i.e. highest value is normalized to 1.0 and lowest value is a ratio of lowest over highest). This was done to maintain the accuracy of the comparison over time where changes in market conditions (e.g. inflation, materials, labour productivities and currencies) would impact the aggregate cost per unit of production (e.g. $CDN/barrel of production or production capacity). The bulk of the simulations were done HYSIS process simulation software and economic models were generated in spreadsheet software and verified according to good engineering practices.

The table shown as FIG. 8 has major technology attributes listed under Parameters in the first column with corresponding results for both Prior Art SAGD in the second column and the results of the ZEIP process in the third column. Comments and units of measure have been listed in the fourth column (column numbering is in reference from left to right).

The positive economics of the ZEIP process over Prior Art SAGD is demonstrated by the significantly lower OPEX and marginally reduced CAPEX. The input costs into the OPEX model were selected based on median forecasted for purchase natural gas, emulsified asphaltene, purchased electricity, post combustion carbon capture and sequestration costs for SAGD for up to 50% of the $CO_2$ in the flue gas not including the $CO_2$ generated from the energy consumed in CCS, and finally purchased carbon credits in a future cap and trade market that implementation of embodiments of this novel technology would qualify for.

Advantages of ZEIP technology with respect to emissions is substantiated by the results shown with SAGD burning clean natural gas, and ZEIP utilizing a dirty fuel such as asphaltene.

With respect to utilities consumption, advantages are substantiated by the significant reduction of all major utilities but electrical power requirements. The negative electrical power requirements are attributed to the power consumed in the centralized cryogenic air separation unit and oxygen compression that was used in the model. Substantial reductions in power consumption will be realized by this invention with the application of local ceramic autothermal recovery (CAR) in lieu of centralized cryogenic ASU.

Advantages with respect to thermal efficiency are substantiated by the significant increase in the combustor efficiency and the process efficiency as demonstrated by the reduced low grade heat rejection values.

Advantageously, the combustion zone is heated with oxygen combustion and can attain a relatively high combustion temperature (e.g. typically in the range of 1500-2500° C.) as compared to combustion with air alone. Such combustion preferentially exceeds the melting temperature, or slag temperature, of the inorganic dissolved or suspended solids (e.g. alkali salts e.g. NaCl, KCl, and the like, alkaline metal salts, e.g. $CaCl_2$, $MgCl_2$, and the like, and silicates and silicate compounds such as aluminosilicates and the like), in the fuel slurry/emulsion or other aqueous mixtures added to the combustion fuel mixture or moderator. Exceeding the melting temperature of the majority of these solids provides an advantage in that the solids are then dewatered and accumulate in the combustor as slag which is then quench in the evaporator and sump. This can facilitate the removal of the solid slag materials by collection in the sump and removal from the system in the slag removal and handling system.

The use of limestone added to the combustion zone via a water slurry either combined with a fuel slurry/emulsion, as a component of the moderator flow or as a separate flow can advantageously result in the reaction to form lime (i.e. $CaCO_3 + Heat \rightarrow CaO + CO_2$). The reaction is known from the prior art to typically occur at temperatures of less than 1000° C. which should be readily obtainable in the combustion zone of the combustor. The lime (CaO), as a product of combustion can be atomized within the combustion zone and which can then interact with the steam generating medium. After being absorbed or dissolved by the steam generating medium, it will then react inside the steam generating medium to form the alkaline earth metal hydroxide ($Ca(OH)_2$). This alkaline earth hydroxide is very reactive with acids such as sulphurous or sulphuric or nitric acid (the acidic products of the combustion reaction of sulfur and nitrogen content in the fuels with the steam generating medium). This acid-base reaction will form sulfite, sulfate and nitrate salts respectively when water is removed from the sump as blowdown or through the slag removal and handling system allowing the further concentration of these potentially useful salts for subsequent processing or disposal as dewatered solids. Alternatively, the lime can be added directly to the steam generating medium for reaction with the acids formed from the sulfur and nitrogen in the fuel. Other carbonate or alkali forming compounds (e.g. $NaHCO_3$ or other alkali or alkaline earth metal carbonates, bicarbonates or hydroxides and the like) as previously known in the art, can also be used to provide a method for neutralizing the acid products of combustion in the steam generating medium.

INDUSTRIAL APPLICABILITY

Technology Attributes

OPEX

The technology results in a substantial reduction in OPEX of heavy oil production through the use of substantially all of the heat of combustion to form a CHM. Substantially all of the heat of combustion may be utilized to make the CHM in comparison to the significant heat losses to flue gases typical in conventional boilers.

Cheaper alternatives to natural gas as fuel, e.g. petcoke, coal, bitumen and bitumen bottoms (e.g. asphaltene or atmospheric/vacuum residual), can be burned directly without the need for flue gas clean up processes to remove sulphur, NOx and SOx. The alternative fuels can be prepared in a central location adjacent to the CPF or upgrader and then transported to the field satellite by pipeline and pumps (e.g. bitumen, atmospheric/vacuum residual or asphaltene could be emulsified at a central location at the CPF). The pumping of a fuel/water slurry is a low energy process since such a slurry is incompressible.

The process has a higher thermal efficiency as the Compound Heat Generator (CHG) is located adjacent to the wellpads (i.e. reducing heat losses in steam pipes) with improved heat integration by waste heat from produced fluids and vapours/gases from the field.

Boiler Scale and Water Treatment

Boiler tubes in current state of the art, once through steam generators (OTSGs) and drum boiler technologies foul or scale from the impurities in the BFW that may ultimately result in the catastrophic failure of boiler tubes. Providing BFW of a suitable quality to prevent fouling of boiler tubes necessitates substantial water treatment of the produced and make-up water thus adding considerable CAPEX and OPEX to the overall production scheme.

Systems and methods according to embodiments of the inventive technology allows the use of substantial amounts of untreated produced water and requires only limited amounts of treated water to raise steam, made possible by directly contacting the contaminated water with the products of combustion, which imparts its heat of combustion to the untreated water to form a CHM (e.g. steam and $CO_2$). The deoiling and water treatment of a small stream of blowdown from the CHG and the CPF provide free water knock out and a treater would still be required to remove concentrated TDS (total dissolved solids), TSS (total suspended solids), O&G (oil and grease) and TOC (total organic carbon). This treated water can then be recycled back from the CPF to the CHG for use as make-up for scrubbing water in the Venturi and wet scrubbers. Water treatment OPEX is driven by power and chemical costs as well as disposal costs of solid and liquid waste streams.

Diluent

A decrease in consumption of diluent for oil treating and transportation of bitumen is realized particularly if bitumen bottoms are removed by physical separation or partial upgrading with rejection of upgrader bottoms. The remaining portion of the barrel has an API gravity and viscosity enabling transport without the need of significant or any diluent blending, depending on the physical separation or partial upgrading process used. Diluent use would be in a closed loop between treating and partial upgrading. As well, non diluent separation and dehydration technologies can be utilized such as high temperature inverted separation and flash treating negating the need to separate the diluents prior to the physical separation and upgrading processes.

Emissions

The technology, when compared to other commercially accepted steam generation technologies, allows for a substantial reduction in emissions per unit of heat output. Natural gas has considerably lower $CO_2$, NOx, SOx and PM emissions per heating value unit than all other alternative fuels. Most alternative fuels have substantial additional amounts of sulphur and small amounts of nitrogen in the fuel, that upon combustion form SOx and fuel bound NOx products that produce acids (e.g. sulphuric acid, $H2SO_4$ from $SO_3$ and nitric acid, $HNO_3$ from $NO_2$) upon reaction with water and are generally considered as harmful to the environment. Thermal NOx is also converted from the $N_2$ in the combustion air in the boiler. Alternative fuels typically have a higher ratio of carbon to hydrogen, compared to that of natural gas (which is mainly methane $CH_4$), which also results in additional $CO_2$ emissions per unit of heat. Existing and future emissions standards will drive the industry to implement further OPEX and CAPEX intensive processes to reduce these greenhouse gases released to the atmosphere through carbon capture and storage. The inventive technology captures the byproducts of combustion, other than $CO_2$, in the steam generating medium, the vast majority of which is retained in the fluid and sent through the sump from the CHG for disposal or concentration as a solid, especially if an alkaline additive such as limestone is added to the steam generating medium or to the moderator. SOx and NOx, when dissolved in aqueous solution in acidic form have high solubility in water are therefore likely to be retained in solution.

However, carbonic acid is only mildly soluble in water and therefore the majority of the $CO_2$ from the combustion process does not remain dissolved in the steam generating medium and becomes a significant component of the CHM and is injected into the reservoir or hydrocarbon bearing matrix material. Excess $CO_2$, that is not retained by thief zones or voidage replacement, is returned to the CPF with the produced fluids and vapour/gases through a gathering system and can then be dried, cleaned, concentrated and transported by pipeline (or other known means) for Enhanced Oil Recovery (EOR), Enhanced Gas Recovery (EGR) or other known use. The NOx and SOx acidic products in solution can be removed from the steam generating medium most effectively through aqueous reactions with reagents such as limestone, or other alkali metal or alkaline earth metal ions to form nitrates and sulphate/sulphite compounds that then can be effectively removed in the sump as solids or as concentrated brine solutions.

The produced water and hydrocarbon fluids can be condensed and separated from the incoming vapour/gases streams from the hydrocarbon containing matrix material (or reservoir). The remaining acid gas stream (predominately $CO_2$) is cooled, compressed, dehydrated and sequestered. The acid gas stream may also be processed to meet sales specifications for use in enhanced oil/gas recovery and sequestration pipelines. In such cases the small amount of light end hydrocarbon gases (e.g. methane and ethane), SOx (primarily derived from the sulfur components of the hydrocarbons themselves) and nitrogen in the acid gas stream can be removed via commercialized solvent and membrane processes. The bottom ash, fly ash and unburnt carbon that typically forms scale in conventional boiler technologies is removed as slag from the CHG or suspended or dissolved solids in the sump slag removal process for the inventive process.

Water Consumption

Water consumption of the technology will be minimal over the long term operation of the facility. The blowdown from the CHG sump is sent to water treatment for separation/dewatering of solids (TDS, TSS and precipitate) and removal of TDS with the treated water being returned to the CHG as BFW or moderator in the combustor. Voidage replacement (i.e. volume required to replace the bitumen produced in the reservoir to maintain reservoir pressure) is at least partially or largely accomplished by $CO_2$ in lieu of the water/steam and purchased natural gas used in other CSS and SAGD processes. This reduces both natural gas and water consumption (a double OPEX advantage). The technology has additional water produced from the products of combustion over most competing technologies (i.e. the combustion of the hydrogen content in the fuel creates water (e.g. $4H+O_2=2H_2O$)). The competing technologies typically exhaust the water from combustion in the flue gases along with any water that was necessary for fuel preparation (e.g. emulsification and steam atomizing) and emission reduction (e.g. flue gas desulphurization and wet electrostatic precipitators) is also consumed without recovery. For a typical prior art OTSG, flue gas water content is about 10 volume percent which is vented to the air and lost to the system. All of this water is captured for use with the inventive technology since it forms part of the CHM directly or condenses into the steam generation medium for subsequent evaporation to form part of the CHM for subsequent use. To some degree, the $CO_2$ injected into the reservoir as part of the CHM will become a sacrificial fluid to thief zones (imperfections in the reservoir that allow steam and gases to migrate outside the bitumen reservoir to adjacent geological strata). The loss of the $CO_2$ to thief zones is beneficial providing it leaves the steam condensate and bitumen behind in the main steam chamber so that it may be recovered with the produced fluids. The $CO_2$ helps pressurize those adjacent thief zones stemming further water losses from the reservoir and may contribute to a reduction in the amount of heat required to mobilize a given portion of hydrocarbon from the hydrocarbon bearing matrix (i.e. a reduction in the steam to oil ratio, SOR).

CAPEX

The overall CAPEX associated with the technology can be installed at a substantial discount to current competing water treatment and steam plant technologies when considering the expected regulatory requirements for carbon capture and sequestration facilities. With the exception of the Atmospheric Separation Unit (ASU) required for oxygen production, all other facilities are simplified, reduced in capacity or completely eliminated. The complexity of current technologies rely on large centralized facilities to obtain the economies of scale necessary to reduce CAPEX on a per flowing barrel basis. The flexibility of the technology allows for decentralized satellite operations to capitalize on reduced gathering/distribution pipeline lengths. These satellites both positively impact CAPEX by way of shorter pipeline lengths but more significantly reduce OPEX associated with the reduced heat and pressure losses from the shorter pipeline lengths. Those facilities that would still benefit from economies of scale such as the ASU, bitumen treating, deoiling, water treatment plant and acid gas compression, dehydration and treatment can remain centralized without negative impact to the operations since these represent the transport of liquids (not pressurized gases) with dramatically lower pumping costs.

Blowdown Phase

Currently in CSS or SAGD, in-situ production uses a considerable amount of natural gas for the blowdown phase of the wellpad. The blowdown phase is the final phase of production where no steam is injected into the reservoir yet the production of bitumen continues as result of the accumulated heat in the reservoir. Injected natural gas provides the reservoir pressure that in turn provides the motive force for the production of the remaining fluid. The blowdown phase normally requires large volumes of natural gas which is not recovered at the end of the blowdown phase.

Systems and methods according to embodiments of the inventive technology, as a minimum, can be utilized just prior to the blowdown phase in conventional CSS and SAGD steam injection facilities, to both provide heat and the gradual accumulation of a non-condensable $CO_2$ pocket over the produced well. The $CO_2$ can be left in the depleted reservoir after final production phase has ceased. Additional $CO_2$ can be injected into the reservoir during the blowdown phase to maintain pressure as the reservoir cools, serving as additional voidage replacement, to make up for $CO_2$ that migrates from the reservoir. Other potential benefits are as follows:

Pump Systems and Lift Gas

Current SAGD operations rely on either ESPs (electric submersible pumps), pump jacks or combination of reservoir pressures and lift gas (i.e. using natural gas to reduce the static head of the oil in the production tubing) to bring the produced fluids to surface. Excess $CO_2$ is produced along with the emulsion (oil and water) for the inventive technology and this allows for higher reservoir pressures and lower static heads on the production tubing potentially negating the need for expensive artificial lift systems.

Current CSS operations rely on pump jacks to bring the produced fluids to surface after the shut in soaking step. For the inventive technology, the less dense $CO_2$ resulting from the injection of CHM is left in the reservoir and acts as an accumulator to push production fluids out of the reservoir and up the production tubing potentially negating the need for pump jacks.

Reservoir

The steam in current known CSS and SAGD processes is injected into the reservoir and develops the steam chamber along a two dimensional interface of steam and bitumen. The addition of a low viscosity $CO_2$ gas under high reservoir pressures for the inventive technology, may develop the steam chamber along fractured fingers into the reservoir away from the steam injector decreasing the temperature gradient and increasing the amount of reservoir exposed to heat thus increasing the oil production per barrel of steam injected (i.e. reduced SOR).

The thermodynamic properties of the compound heat medium are determined by the concentration of $CO_2$ in the stream. The higher the $CO_2$ concentration in the CHM for the inventive technology allows for a lower temperature for any given pressure than that of the pure saturated steam. In other words, as the concentration of steam in the CHM decreases so would its temperature regardless of the overall compound medium pressure (laws of partial pressure). A reservoir utilizing a CHM could operate at a higher pressure and lower temperature than pure steam. This conserves heat in the reservoir by allowing cooler production. Sub-cool is defined as the difference between the steam injection temperature and the temperature of the produced fluids. The more the sub-cool temperature the greater the heat conservation in the reservoir.

Cyclic Steam Stimulation (CSS)

The inventive technology is applicable to CSS. In this case, after an injection period during which a maximum amount of non-condensables are accumulated in the reservoir (i.e. maximum reservoir pressure desired), CHM injection is discontinued and the well is shut in. After a shut-in period determined by that period of time required to condense out the steam from the CHM and in turn to heat the bitumen, the bitumen is produced up the production well heel and toe tubing with the aid of $CO_2$ lift gas, pump jacks or ESPs. Upon completion of the production phase, the accumulated non-condensables in the reservoir are removed from the production and/or injection wells simultaneously. Once the reservoir has been degassed and de-pressured then the cycle is repeated. The satellite and CPF operations would remain continuous by having a number of well pads on staggered cycles (e.g. on wellpad shut in while another is on injection or production phase).

Gas Over Bitumen Production

Best practice for exploitation of heavy oil resources is that bitumen is preferentially produced over natural gas, particularly in the event of a natural gas cap overlying a bitumen reservoir. In the subject technology, the gas cap, if present, may assist in the production of bitumen by virtue of the build-up of non-condensables on the top of the bitumen reservoir and below the overlying gas reservoir. As a result, the technology may allow for economical and efficient production of this gas cap, as a result of non-condensables sweeping the overlying gas upwards toward separate or distinct gas wells that may enable overlying gas and bitumen to be concurrently produced.

The core components of the compound heat medium generating system (i.e. combustor, evaporator and separator) as described above could be modified and in other embodiments deployed for generating a compound heat medium comprising saturated steam and carbon dioxide for a wide variety of other applications such as: providing saturated steam for power generation, pulp and paper or a chemical process.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of extracting a hydrocarbon from a hydrocarbon bearing matrix material comprising the steps of:
   (a) generating a compound heat medium comprising fuel combustion products, carbon dioxide and steam at elevated temperature and pressure by steps of:
   in a first stage combusting a fuel in the presence of an oxidant and a moderator to create products of combustion at an elevated temperature and pressure comprising carbon dioxide;
   in a second stage contacting a steam generating medium with said products of combustion at elevated temperature and pressure, to generate steam;
   (b) delivering the compound heat medium at pressure to the hydrocarbon bearing matrix material thereby condensing steam and heating and mobilizing a portion of hydrocarbons;
   (c) recovering under pressure a mobilized portion comprising hydrocarbons and
   carbon dioxide, and separating pressurized carbon dioxide from the mobilized portion,
   wherein separating pressurized carbon dioxide from the mobilized portion, further comprises at least one of compressing, purifying and dehydrating the carbon dioxide for use in subsequent processing.

2. A method according to claim 1, wherein in the second stage, contacting the steam generating medium with said products of combustion comprises injecting the steam generating medium, evaporating a portion of the steam generating medium to form steam, and accumulating a reservoir of unevaporated steam generating medium.

3. A method according to claim 2, comprising delivering a portion of the accumulated steam generating medium to the combustor to provide a portion of the moderator.

4. A method according to claim 3, wherein the moderator comprises combustibles that are combusted in the first stage.

5. A method according to claim 3, wherein the moderator comprises non-combustible solids.

6. A method according to claim 1, wherein the mobilized portion comprises aqueous condensate, and further comprising recovering said aqueous condensate from the mobilized portion.

7. A method according to claim 6 wherein at least a portion of the aqueous condensate is recovered to provide a portion of at least one of a moderator and a steam generation medium.

8. A method according to claim 7, wherein when the aqueous condensate added to the steam generating medium comprises solids, evaporating a portion thereby generating steam, and concentrating solids in the accumulated portion of the steam generating medium.

9. A method according to claim 8, wherein the combustion products comprise particulates that may solidify the first or second zone, and wherein aqueous condensate is added to flush particulates into the reservoir of accumulated steam generating medium.

10. A method according to claim 1 wherein subsequent processing comprises one of enhanced oil recovery (EOR), enhanced gas recovery (EGR), and sequestration, or other tertiary oil recovery process.

11. A method according to claim 1, wherein the steam portion of the compound heat medium comprises saturated steam.

12. A method according to claim 1, wherein at least a portion of the steam and carbon dioxide are retained in the hydrocarbon matrix through repressurizaton of adjacent reservoir zones, voidage replacement and leakage to adjacent strata.

13. A method according to claim 1, comprising recovering at least 50% of the carbon dioxide that is delivered to the hydrocarbon bearing matrix material.

14. A method according to claim 1, comprising performing steps of combusting the fuel and contacting the steam generating medium with the products of combustion at a pressure of greater than 100 kPa above ambient pressure.

15. A method according to claim 1, wherein carbon dioxide recovered along with the mobilized portion is recovered at a pressure of greater than 100 kPa above ambient pressure.

16. A method according to claim 1, wherein the fuel is selected from the group consisting of fossil fuels, hydrocarbon derived fuels, refuse derived fuels, synthetic fuel, and mixtures thereof, wherein
   the fossil fuels are natural gas, anthracite, coal, sub-bituminous coal, lignite, and peat;
   the hydrocarbon derived fuels are atmospheric residuals, vacuum residuals, asphaltene, pitch, char, and coke;
   the refuse derived fuels are wood waste; municipal solid waste and sewage waste; and
   the synthetic fuel is syngas.

17. A method according to claim 1, wherein the oxidant comprises at least 50 volume percent oxygen.

18. A method according to claim 1, wherein the moderator is one of liquid water, steam, recycled produced water, carbon dioxide, and mixtures thereof.

19. A method according to claim 1, wherein the steam generating medium comprises a recycled produced water, and the step of contacting of the steam generating medium with the products of combustion causes boiling of water to produce steam.

20. A method according to claim 1, wherein step a) further comprises separating particulates from the compound heat medium before performing step b).

21. A method according to claim 20 wherein separating particulates comprises passing the compound heat medium through at least one of a Venturi scrubber, a vane scrubber and a wet scrubber before step b).

22. A method according to claim 1, wherein the fuel comprises an ash and the method further comprises, after contacting a steam generating medium with said products of combustion, a step of recovering a portion of resulting suspended and dissolved solids from the steam generating medium.

23. A method according to claim 1, wherein the mobilized portion of hydrocarbons further comprises one or more of dissolved and suspended solids and water soluble hydrocarbons and wherein after recovering produced water comprising said dissolved or suspended solids and water soluble hydrocarbons, injecting said produced water at step a) as one or both of a moderator and a steam generating medium, thereby combusting the water soluble hydrocarbons and separating the suspended and dissolved solids from the steam generating medium.

24. A method according to claim 1, comprising recovering a heavy hydrocarbon from the matrix material.

25. A method according to claim 24 wherein the hydrocarbon bearing matrix material comprises mined material.

26. A method according to claim 1, wherein the combustion temperature in the combustion zone is greater than the melting temperature of at least one dissolved or suspended solid impurity in the combustion mixture.

27. A method of extracting a hydrocarbon from a hydrocarbon bearing matrix material comprising the steps of:
  (a) generating a compound heat medium comprising fuel combustion products, carbon dioxide and steam at elevated temperature and pressure by steps of:
  in a first stage combusting a fuel in the presence of an oxidant and a moderator to create products of combustion at an elevated temperature and pressure comprising carbon dioxide;
  in a second stage contacting a steam generating medium with said products of combustion at elevated temperature and pressure, to generate steam;
  (b) delivering the compound heat medium at pressure to the hydrocarbon bearing matrix material thereby condensing steam and heating and mobilizing a portion of hydrocarbons;
  (c) recovering under pressure a mobilized portion comprising hydrocarbons and carbon dioxide, and separating pressurized carbon dioxide from the mobilized portion;
  wherein in step a) the oxidant for combustion comprises oxygen, and comprising providing oxygen by a ceramic autothermal recovery (CAR) process comprising delivering a portion of the compound heat medium for desorption of oxygen.

28. A system for extracting a hydrocarbon from a hydrocarbon bearing matrix material comprising:
  a compound heat medium generator comprising:
  a first zone for oxy-combustion of a fuel in the presence of an oxidant and a moderator to create products of combustion at an elevated temperature and pressure comprising carbon dioxide,
  the first zone for oxy-combustion having inputs for fuel, oxidant and moderator, and an output for directing products of combustion to a second zone,
  the second zone for contacting a steam generating medium with said products of combustion at elevated temperature and pressure, to generate steam, thereby generating a pressurized compound heat medium comprising products of combustion, carbon dioxide and steam at elevated temperature,
  the first zone being vertically located above the second zone with first outlet means of the first zone disposed at the bottom of the first zone for directing the compound heat medium for contacting the steam generating medium in the second zone;
  a third zone below the second zone comprising a separation zone and sump means for recovering solids settled by gravity from the steam generating medium in the second zone,
  and
  second outlet means from the second zone of the compound heat medium generator for coupling the compound heat medium generator to an injection means for delivering the compound heat medium at pressure to the hydrocarbon bearing matrix material, thereby condensing steam and heating and mobilizing a portion of hydrocarbons; and
  a separation system for coupling to recovery means for recovering under pressure a mobilized portion comprising hydrocarbons, and carbon dioxide, and separating pressurized carbon dioxide from the mobilized portion.

29. A system according to claim 28 wherein the separation system is coupled to at least one of the first and second zones for delivery of one or both of recycled produced water unit and recovered carbon dioxide thereto.

30. A system according to claim 28 further comprising a particulate separator disposed before or after the second zone for removing particulates from the combustion products and from the compound heat medium.

31. A system according to claim 28 wherein the particulate separator comprises at least one of a Venturi scrubber, a vane scrubber and a wet scrubber.

32. A system according to claim 28 wherein the system further comprises an air separation unit for generating said oxidant for the first zone.

33. A system according to claim 32 wherein air separation unit comprises a ceramic autothermal recovery (CAR) unit, the CAR unit having input means for receiving a portion of the compound heat medium for desorption of oxygen, to generate oxidant for combustion.

34. A system according to claim 28 wherein:
  the injection means comprises a first connection for coupling to an injection well head; and
  the recovery means comprises a second connection for coupling to a production wellhead.

\* \* \* \* \*